United States Patent
Hennig et al.

(10) Patent No.: US 10,960,797 B2
(45) Date of Patent: Mar. 30, 2021

(54) EDGE STRIP, SEAT COVER AND SEAT COMPRISING A SEAT COVER

(71) Applicant: Adient Luxembourg Holding S.à r.l., Luxembourg (LU)

(72) Inventors: Lars Hennig, Leichlingen (DE); Michelle Hering, Dortmund (DE); Anja Schaetzmueller, Lindlar (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 130 days.

(21) Appl. No.: 16/303,944

(22) PCT Filed: May 23, 2017

(86) PCT No.: PCT/EP2017/062419
§ 371 (c)(1),
(2) Date: Nov. 21, 2018

(87) PCT Pub. No.: WO2017/202850
PCT Pub. Date: Nov. 30, 2017

(65) Prior Publication Data
US 2020/0254910 A1    Aug. 13, 2020

(30) Foreign Application Priority Data

May 24, 2016  (DE) .................... 10 2016 209 034.8
Jun. 17, 2016  (DE) .................... 10 2016 210 873.5

(51) Int. Cl.
| B60N 2/58 | (2006.01) |
| A47C 31/02 | (2006.01) |
| B60N 2/60 | (2006.01) |

(52) U.S. Cl.
CPC ............ *B60N 2/5833* (2013.01); *A47C 31/02* (2013.01); *A47C 31/023* (2013.01); *B60N 2/5816* (2013.01); *B60N 2/6018* (2013.01); *B60N 2/6036* (2013.01)

(58) Field of Classification Search
CPC .. B60N 2/5833; B60N 2/6036; B60N 2/5816; B60N 2/6018; A47C 31/02; A47C 31/023
See application file for complete search history.

(56) References Cited

U.S. PATENT DOCUMENTS

| 2,290,007 A | 7/1942 | Valentine |
| 2,440,138 A | 4/1948 | Benenfeld |
(Continued)

FOREIGN PATENT DOCUMENTS

| CN | 1590277 A | 3/2005 |
| CN | 102368925 A | 3/2012 |
(Continued)

OTHER PUBLICATIONS

The State Intellectual Property Office of People's Republic of China. The First Office Action issue in Application No. 201780031984.1 dated Jun. 23, 2020, 22 pages.
(Continued)

*Primary Examiner* — Syed A Islam
(74) *Attorney, Agent, or Firm* — Marshall & Melhorn, LLC

(57) ABSTRACT

An edge strip (10) is provided for a seat cover (6, 20). The edge strip (10) includes an edge strip core (10.1) that is surrounded, in particular cladded, by a fastening material (10.4). A seat cover (6, 20) is provided for a seat (5) and includes the edge strip (10). A seat (5) is also provided that includes the seat cover (6, 20).

13 Claims, 5 Drawing Sheets

(56) References Cited

U.S. PATENT DOCUMENTS

| | | | |
|---|---|---|---|
| 2,659,421 A | | 11/1953 | Wass et al. |
| 2,770,816 A | | 11/1956 | Reisner |
| 4,095,543 A | | 6/1978 | Gassman |
| 5,005,242 A | * | 4/1991 | Kennedy ............... B60N 2/5825 24/444 |
| 5,236,243 A | * | 8/1993 | Reyes ................... B60N 2/5833 24/442 |
| 6,206,467 B1 | * | 3/2001 | Mense ..................... B60N 2/58 297/218.2 |
| 6,443,525 B1 | | 9/2002 | Haupt |
| 6,588,838 B1 | * | 7/2003 | Dick, Jr. ............... B60N 2/5825 297/216.13 |
| 8,662,583 B2 | * | 3/2014 | Guadagno ............ B60N 2/5833 297/218.1 |
| 8,882,203 B2 | * | 11/2014 | Takehara ............... A47C 31/023 297/218.2 |
| 8,962,121 B2 | * | 2/2015 | Billarant .............. B60N 2/5833 428/100 |
| 9,061,882 B2 | * | 6/2015 | Masuda .................. A47C 31/02 |
| 9,783,090 B2 | * | 10/2017 | Yoshida ................ B60N 2/5833 |
| 10,426,231 B2 | * | 10/2019 | Murasaki ............ A44B 18/0076 |
| 2005/0039312 A1 | * | 2/2005 | Tanokura ............ B60N 2/5833 24/442 |
| 2008/0061610 A1 | | 3/2008 | Tache |
| 2008/0223525 A1 | * | 9/2008 | Hanteville ........... B60N 2/5833 156/433 |
| 2012/0291237 A1 | | 11/2012 | Billarant et al. |
| 2015/0375654 A1 | | 12/2015 | Lemarchand et al. |
| 2016/0052433 A1 | * | 2/2016 | Ono ..................... B60N 2/5825 297/452.61 |
| 2017/0253157 A1 | | 9/2017 | Nagasawa et al. |
| 2017/0327017 A1 | * | 11/2017 | Nagasawa ............ B60N 2/6018 |

FOREIGN PATENT DOCUMENTS

| | | | | |
|---|---|---|---|---|
| DE | 6944602 U | | 3/1970 | |
| DE | 1017769 U | | 8/1970 | |
| DE | 73 32 499 U | | 12/1973 | |
| DE | 81 36 861 U1 | | 4/1982 | |
| DE | 3422769 A1 | | 1/1986 | |
| DE | 3620695 A1 | | 4/1988 | |
| DE | N608278 U1 | | 8/1996 | |
| DE | 102007011575 A1 | | 9/2008 | |
| DE | 10 2008 013 149 A1 | | 10/2008 | |
| DE | 11 2014 003 957 T5 | | 5/2016 | |
| EP | 0988179 A1 | | 3/2000 | |
| EP | 0 988 179 B1 | | 11/2001 | |
| EP | 2 422 638 A1 | | 2/2012 | |
| EP | 2 979 569 A1 | | 2/2016 | |
| EP | 2979569 A1 | | 2/2016 | |
| FR | 1593125 A | | 5/1970 | |
| FR | 2 781 733 B1 | | 9/2000 | |
| FR | 2900607 A1 | | 11/2007 | |
| FR | 3 010 012 A1 | | 3/2015 | |
| JP | S633263 U | | 1/1988 | |
| JP | H107186160 A | | 7/1995 | |
| JP | 2004-242 909 A | | 9/2004 | |
| JP | 20044242909 A | | 9/2004 | |
| JP | 2007111104 A | | 5/2007 | |
| JP | 2012-223 262 A | | 11/2012 | |
| JP | 2016097773 A | | 5/2016 | |
| JP | 2016097948 A | * | 5/2016 | ........... B60N 2/6018 |
| WO | 2016063629 A1 | | 4/2016 | |

OTHER PUBLICATIONS

German Patent and Trademark Office, Office Action in Application No. DE 10 2016 210 873.5, dated Oct. 29, 2020, 14 pages. Munich Germany.

* cited by examiner

EDGE STRIP, SEAT COVER AND SEAT COMPRISING A SEAT COVER

CROSS REFERENCE TO RELATED APPLICATIONS

This application is a United States National Phase Application of International Application PCT/EP2017/062419, filed May 23, 2017, and claims the benefit of priority under 35 U.S.C. § 119 of German Applications 10 2016 209 034.8, filed May 24, 2016 and 10 2016 210 873.5, filed Jun. 17, 2016, the entire contents of which are incorporated herein by reference.

TECHNICAL FIELD

The invention relates to an edge strip as well as a seat cover for a seat, in particular a vehicle seat. The invention further relates to a seat.

BACKGROUND

A seat, such as for example a vehicle seat, is generally provided with a seat cover. Moreover, it is known to fasten the seat cover releasably to the seat in order to remove or replace the seat cover, for example. To this end, it is known, for example, to provide the seat cover and correspondingly the seat on the surface side with fastening means, such as for example a hook tape and opposingly thereto a fleece tape.

For example, it is disclosed in FR 2 781 733 B1 to apply a hook tape and a fleece tape to the seat cover and/or the seat. By such a hook and loop connection the seat cover may be easily detached from the seat and fastened again thereto.

An edge strip with a light-conducting core is disclosed in EP 0 988 179 B1, for the fastening thereof said edge strip being encased by a film, the ends thereof forming a stitched tab.

SUMMARY OF THE INVENTION

An object of the invention is to specify an edge strip for a seat cover which is improved relative to the prior art, and an improved seat cover comprising such an edge strip and an improved seat comprising a seat cover.

An edge strip according to the invention for a seat cover comprises an edge strip core which is surrounded, in particular encased, by a fastening material. According to one embodiment of the invention, the fastening material is configured as a hook and loop material.

The edge strip in this case is configured as a fastening and/or edge-reinforcing edge strip and by being introduced into a seat cover permits a seat cover which is visually attractive, in particular smooth or without folds, relative to conventionally applied fastening means, such as for example hook and loop tapes bonded thereto.

According to one embodiment of the invention, the hook and loop material is a hook material, in particular a hook tape, mushroom-head tape or eyelet tape material. Alternatively, the hook and loop material may also be configured as a fleece material.

The fastening material may be fastened to the edge strip core by means of a material bond. For example, the fastening material is bonded or welded to the edge strip core. The fastening material in this case may also be configured to be self-adhesive, for example by means of an adhesive coating on a side facing the edge strip core, wherein a shear force of the adhesive coating is greater than a shear force of the releasable connection between the fastening material and an adhesive material arranged on the seat cover.

According to a further embodiment of the invention, a cover material is arranged between the fastening material and the edge strip core. The cover material, on the one hand, serves as a lamination of the edge strip core. On the other hand, the cover material serves for fastening the edge strip, for example to a seat part, in particular a seat surface or to a lower seat cover. The cover material at the same time encases the edge strip core and is bonded or stitched to the ends thereof, forming an edge strip tab. The fastening material in this case is connected to the cover material and encases the cover material encasing the edge strip core. The fastening material in this case may be firmly bonded to the cover material. In particular, the fastening material is bonded or welded to the cover material. Alternatively, the fastening material may also be stitched to the cover material.

Alternatively, it is possible that the fastening material directly encases the edge strip core and at the ends thereof forms an edge strip tab.

Preferably the edge strip core is formed from a elastical material, in particular from synthetic material or rubber. This permits pleasant seating comfort for a person seated on the seat cover. Moreover, the cover material is formed from synthetic material, for example polypropylene, or a natural material. The cover material is configured, in particular, to be stronger than the edge strip core.

A seat cover according to the invention for a seat comprises a plurality of cover parts, wherein at least one edge strip according to the invention is provided in the region of at least two cover parts connected with each other.

By introducing the edge strip a visually attractive, in particular smooth or fold-free, seat cover is permitted, said seat cover being able to be connected to the seat and thus replaced in a simple manner.

A seat, in particular a vehicle seat, according to the invention comprises a seat cushion, a lower seat cover fastened to the seat cushion and an upper seat cover which is able to be releasably fastened to the lower seat cover. In this case one of the seat covers is provided with at least one edge strip according to the invention, wherein the other seat cover is provided with a retaining material into which the fastening material of the edge strip engages in a retaining manner in the connected state.

By selecting a specific seat cover, in particular the material thereof, an individual seat may be provided thereby. In particular, seats with different decorative effects or seats with different seat properties, with seat heating and/or ventilation and/or with air-conditioning zones, may be provided as a result.

According to one embodiment of the seat, the retaining material is a fleece material which produces a releasable connection with a hook and loop material, which is configured as hook material. Alternatively, the retaining material may also be a hook material, wherein the fastening material is a loop material or fleece material. The retaining material may be firmly bonded to the seat cover. For example, the retaining material is bonded or welded to the seat cover. Alternatively, the retaining material may also be stitched to the seat cover.

Exemplary embodiments of the invention are described in more detail with reference to drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
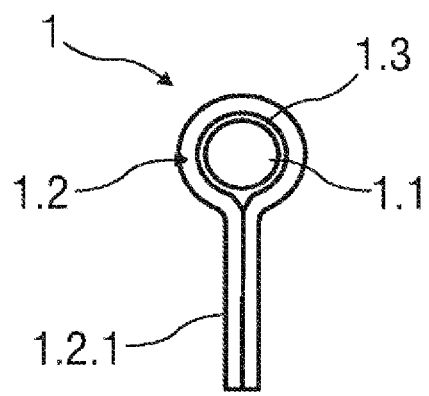
FIG. 1 is a schematic view of an exemplary embodiment of an edge strip according to the prior art.

Referring to the drawings, parts which correspond to one another are provided in all of the figures with the same reference numerals.

FIG. 1 shows schematically in section an exemplary embodiment of an edge strip 1 according to the prior art. Edge strips 1 are used in the automotive field. The edge strip 1 generally serves for covering visible joints, for example between two parts, such as for example between seat cover parts or parts of a trim part. The edge strip 1 is also used in the transition region between parts in order to permit, for example, a fluent transition without the disruptive appearance of joints. By means of the edge strip 1, therefore, the aesthetic appearance of a component, such as that of a seat or seat cover, is enhanced.

The edge strip 1 comprises an edge strip core 1.1 and a cover material 1.2 surrounding this edge strip core. The cover material 1.2 surrounds the edge strip core 1.1 fully and protrudes in the form of edge strip tabs 1.2.1. The edge strip core 1.1 is made, for example, from a elastical material, for example from synthetic material or caoutchouc. The cover material 1.2 and the edge strip tabs 1.2.1 are configured in one piece. For example, the cover material 1.2 and the edge strip tabs 1.2.1 are formed from a decorative material, in particular from a synthetic material or a natural material, for example from polypropylene, artificial leather or genuine leather or a different textile.

In the exemplary embodiment shown, the cover material 1.2 encases or is wrapped around the edge strip core 1.1. The free ends of the cover material 1.2 protrude from the wrapped-around edge strip core 1.1 in the form of the edge strip tabs 1.2.1.

The edge strip 1 may be in one piece, as an element produced in an extrusion or injection-molding process. Alternatively, the cover material 1.2 with the edge strip tabs 1.2.1 and the edge strip core 1.1 may be produced separately, wherein the edge strip core 1.1 is able to be inserted into an edge strip receiver 1.3 of the cover material 1.2 and is able to be arranged therein.

Figure 2:
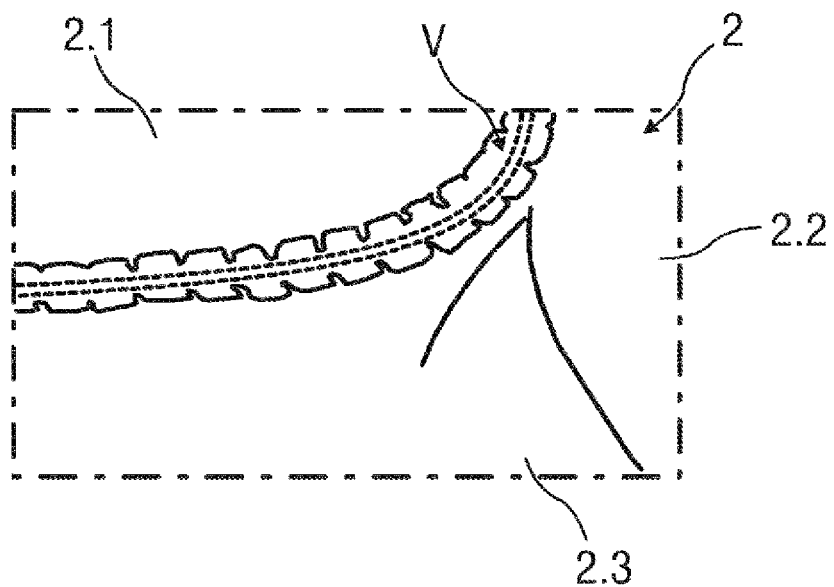
FIG. 2 is a schematic view of an exemplary embodiment of a releasable seat cover with a connecting means applied on the surface side according to the prior art.

FIG. 2 shows schematically an exemplary embodiment for a releasable seat cover 2 with a connecting means V applied to the surface side according to the prior art. The seat cover 2 comprises a plurality of cover parts 2.1 to 2.3. The connecting means V in this case is arranged in the transition region B between two adjacent cover parts 2.1 to 2.3 on the seat cover 2. In the exemplary embodiment, the connecting means V is configured as an adhesive strip bonded thereon.

Figure 3A:
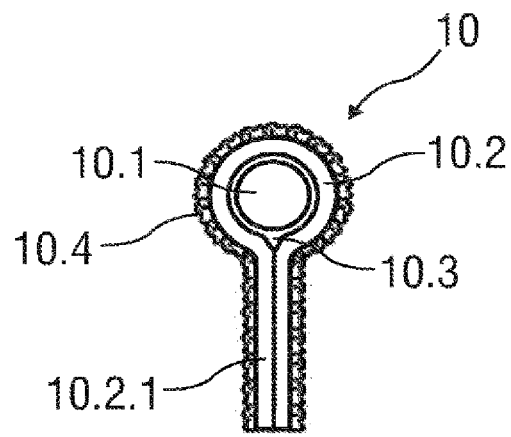
FIG. 3A is a schematic view of an exemplary embodiment of an edge strip according to the invention.

FIG. 3A shows schematically an exemplary embodiment of an edge strip 10 according to the invention. The edge strip 10 according to the invention has an edge strip core 10.1 which is surrounded by a cover material 10.2. The cover material 10.2 in turn is surrounded, in particular encased, by a fastening material 10.4, in particular a hook and loop material. For improved clarity, the fastening material 10.4 is denoted hereinafter as hook and loop material 10.4.

The edge strip core 10.1 is made from a elastical material, in particular from synthetic material or rubber. The cover material 10.2 is made from synthetic material, for example polypropylene, or a natural material, such as for example leather or fabric. The cover material 10.2 is configured, in particular, to be stronger than the edge strip core 10.1.

Depending on the type and shape of the hook and loop material 10.4, the cover material 10.2 may be dispensed with and the hook and loop material 10.4 may directly encase the edge strip core 10.1 and have a receiver 10.3 for the edge strip core 10.1. The hook and loop material 10.4 may be configured as a hook and loop tape or hook and loop fabric (=wide fabric). It may be configured to be self-adhesive on one side or on both sides. Preferably, the hook and loop material 10.4 applied to the edge strip 10 is a hook material, in particular a hook tape, mushroom-head tape or eyelet tape material. Alternatively, an adhesive material or fleece material, in particular an adhesive tape or fleece tape or an adhesive fabric or fleece fabric, may be applied to the edge strip 10 as hook and loop material 10.4. The hook and loop material 10.4 is fastened by a material bond to the edge strip 10, in particular bonded or welded.

Figure 3B:
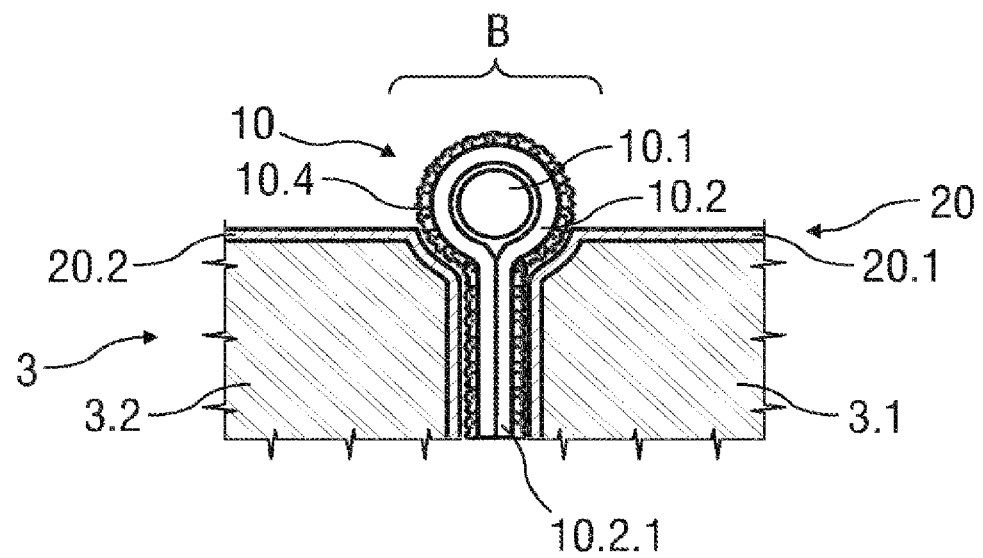
FIG. 3B is a schematic view of an exemplary embodiment of a seat cover according to the invention with an edge strip according to the invention.
Figure 3C:
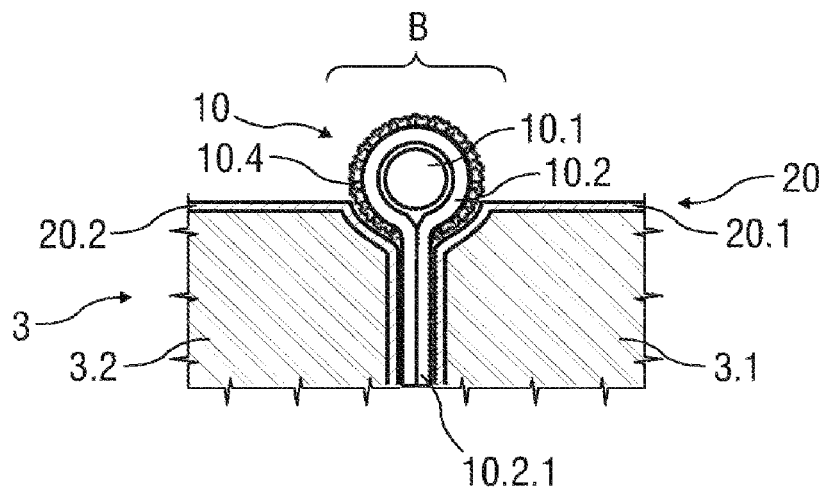
FIG. 3C is a schematic view of an exemplary embodiment of a seat cover according to the invention with an edge strip according to the invention.

FIGS. 3B-3C show schematically different exemplary embodiments of a seat cover 20 according to the invention comprising an edge strip 10 according to the invention.

The seat cover 20 comprises a plurality of cover parts 20.1, 20.2. The cover parts 20.1, 20.2 are fixedly fastened, for example laminated, onto a carrier 3 of a seat 5 (see FIG. 4). In other words: the cover parts 20.1, 20.2 are applied in the form of laminations onto the carrier 3 or the carrier parts 3.1, 3.2 thereof.

The edge strip 10 is provided in the transition region B of at least two cover parts 20.1, 20.2 connected with each other. Thus the edge strip 10 is integrated in the seat cover 20. The edge strip 10 is encased by a hook and loop material 10.4 which protrudes outwardly from the surface of the seat cover 20, in particular a lamination.

In FIG. 3B, the edge strip 10 is fully encased by the hook and loop material 10.4, also in the region of the hook and edge strip tabs 10.2.1. As a result, the edge strip 10 may be easily fastened between the two cover parts 20.1, 20.2.

Alternatively, the edge strip 10, as shown in FIG. 3C, may be provided with hook and loop material 10.4 only in the outer region of the edge strip 10, i.e. only in the outer region surrounding the edge strip core 10.1. In this case, the edge strip tabs 10.2.1 are fastened in a different manner to the seat cover 20, for example stitched, bonded or welded. Depending on the type and manner of the hook and loop material 10.4, the cover material 10.2 may be dispensed with and the hook and loop material 10.4 may directly encase the edge strip core 10.1 and have a receiver 10.3 for the edge strip core 10.1 as shown in FIG. 3E. In this case, a core tab 10.1.1 serves for the fastening and is formed by the hook and loop material 10.4.

Figure 3D:
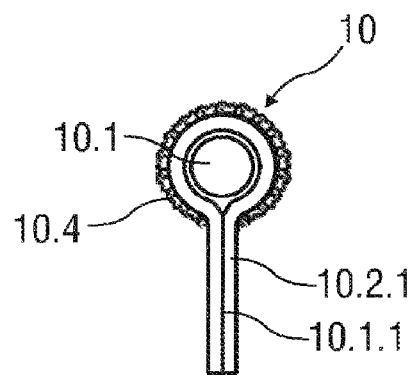
FIG. 3D is a schematic view of an exemplary embodiment of an edge strip according to the invention.
Figure 3E:
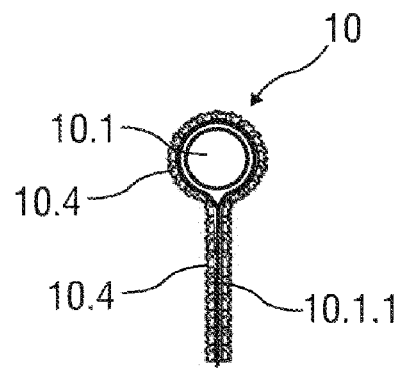
FIG. 3E is a schematic view of an exemplary embodiment of an edge strip according to the invention.

FIG. 3D shows an embodiment of an edge strip 10 as is used in FIG. 3C.

Figure 4:
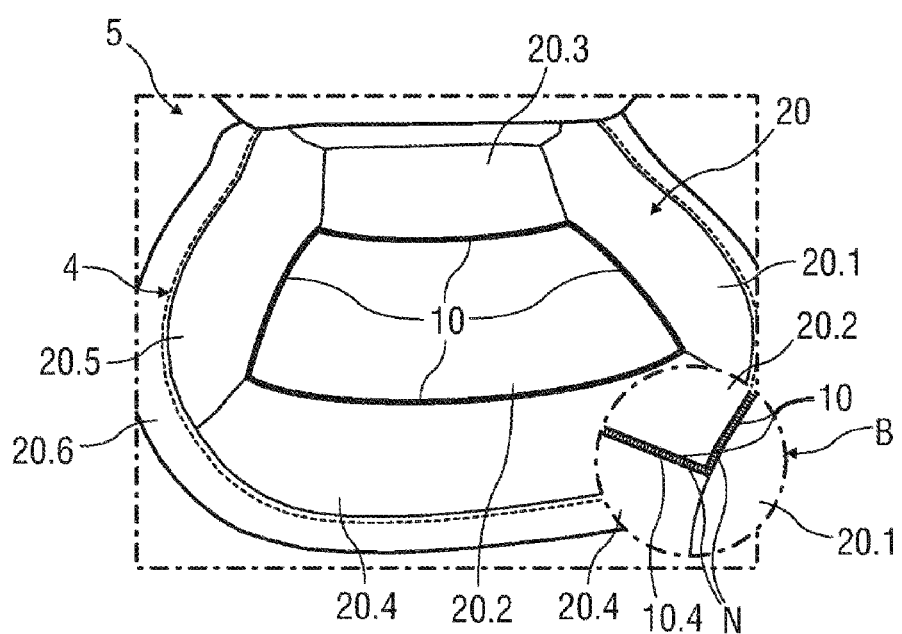
FIG. 4 is a schematic view of a plan view of a lower seat cover with an edge strip according to the invention.

FIG. 4 shows schematically a plan view of a lower seat cover 20 for a seat part 4 of a seat 5 with an enlarged view of a transition region B between adjacent cover parts 20.1, 20.2, 20.4. The lower seat cover 20 has a plurality of cover parts 20.1 to 20.6. The edge strip 10 according to the invention is provided in the transition region B between at least two adjacent cover parts 20.1 and 20.2, 20.2 and 20.3, 20.2 and 20.5 and/or between 20.2 and 20.4. In this case, the edge strip 10 may be arranged only partially between the cover parts 20.1 to 20.6. Alternatively or additionally, the edge strip 10 may extend over the entire length in the transition region B between two adjacent cover parts 20.1 to 20.6. In this case, the edge strip 10 is arranged between at least two of the cover parts 20.1 to 20.6 such that, as is shown for example in FIG. 3B or 3C, the edge strip core 10.1 protrudes from the seat cover 20 on the surface side, for example, in the shape of a bead. In other words: the edge strip core 10.1 which is encased at least by the hook and loop material 10.4 protrudes from this seam N in the transition region B, in particular at least partially along a seam N between two cover parts 20.1 to 20.6 which are connected with each other. Since only the edge strip core 10.1 protrudes from the seat cover 20 in the transition region B in the manner of a head protruding from the seam N, the edge strip core 10.1 forms a protruding bead so that a part to be fastened to the seat cover 20, for example a further seat cover 6, may adhere in a simple and secure manner to the hook and loop material 10.4.

Figure 5:
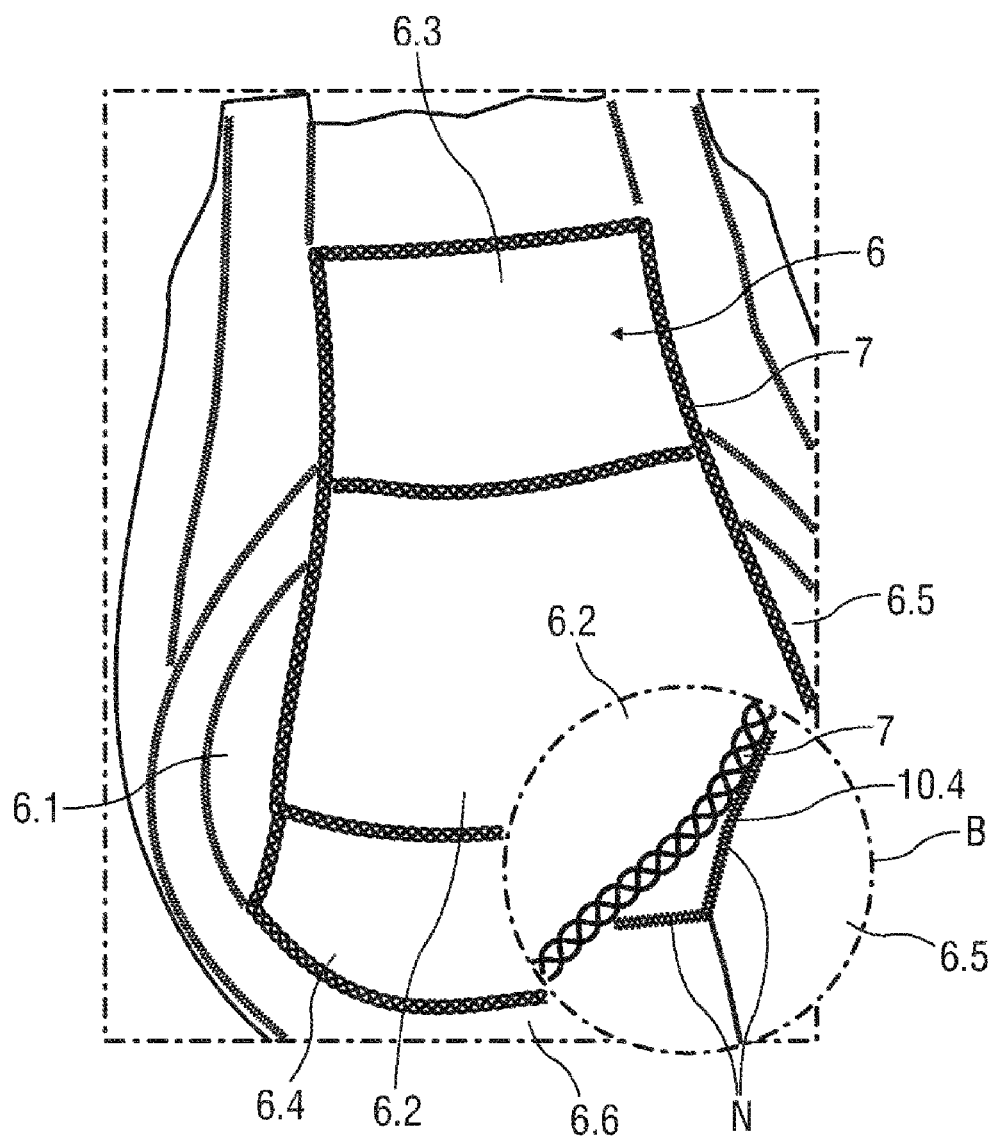
FIG. 5 is a schematic view of exemplary embodiment of an upper removable or releasable seat cover.

The seat cover 20 shown in FIG. 4 is a lower seat cover for a seat surface or a seat part 4 of the seat 5. An upper seat cover 6, which is shown in FIG. 5, may be releasably fastened to this lower seat cover 20, in particular a seat cushion. In other words: the upper seat cover 6 is able to be releasably fastened to the lower seat cover 20.

For the releasable fastening of the upper seat cover 6 to the lower seat cover 20, the upper seat cover 6 is provided with a retaining material 7, in particular a fleece material. Thus the two seat covers 6, 20 are able to be releasably connected via a hook and loop connection between the hook and loop material 10.4 of the edge strip 10 in the lower seat cover 20 and the retaining material 7 of the upper seat cover 6, at least partially along the seam N.

The hook and loop material 10.4 and the retaining material 7 are arranged at opposing points of the seat covers 6, 20. Thus the hook and loop material 10.4 of the edge strip 10 and the retaining material 7 of the upper seat cover 6 come into contact with one another and engage in one another in the connected state. By pulling apart, in particular pulling off, the upper seat cover 6 from the lower seat cover 20 which is fixedly retained on the seat part 4, both seat covers 6, 20 are able to be detached from one another.

Both seat covers 20 and 6 are configured, for example, correspondingly to one another and have a corresponding number of cover parts 20.1 to 20.6 and/or 6.1 to 6.6.

In the transition region B, in particular in the seam region between adjacent cover parts 6.1 to 6.6, the removable upper seat cover 6 comprises the retaining material 7. Similarly, in this seam region the lower seat cover 20 comprises the edge strip 10 with the outwardly facing hook and loop material 10.4.

Thus the edge strip 10 of the lower seat cover 20 is configured as a fastening edge strip and/or edge-reinforcing edge strip. Such an edge strip 10 which is configured as a fastening edge strip, in particular a so-called hook and loop strip, for fastening the upper seat cover 6 to the seat 5, in particular to the lower seat cover 20 thereof, permits an impression of neatness and comfort. As a result, a visually improved, in particular fold-free, seat cover 20, 6 with at the same time a releasable fastening is provided.

While specific embodiments of the invention have been shown and described in detail to illustrate the application of the principles of the invention, it will be understood that the invention may be embodied otherwise without departing from such principles.

The invention claimed is:

1. A vehicle seat comprising:
   a seat cushion;
   a lower seat cover fastened to the seat cushion;
   an upper seat cover which is releasably fastened to the lower seat cover;
   a retaining material; and
   at least one edge strip comprising fastening material and an edge strip core surrounded by the fastening material,
   wherein one of the seat covers is provided with the at least one edge strip and
   wherein the other seat cover is provided with the retaining material into which the fastening material retainingly engages, in a connected state; and
   wherein the two seat covers are vertically arranged and releasably connected with each other by the edge strip.

2. The seat according to claim 1, wherein the retaining material is a fleece material.

3. The seat according to claim 1, wherein the fastening material comprises a hook material and a loop material.

4. The seat according to claim 1, further comprising a cover material arranged between the fastening material and the seat core, wherein the seat core is formed from an elastical material comprising synthetic material or rubber and the cover material is formed from synthetic material, leather or woven fabric.

5. The seat according to claim 1, wherein the cover material is formed from synthetic material, leather or woven fabric and the fastening material is formed from synthetic material.

6. The seat cover according to claim 1, wherein the fastening material is firmly bonded to a seat core.

7. The seat cover according to claim 1, further comprising a cover material arranged between the fastening material and a seat core.

8. The seat cover according to claim 7, wherein the cover material is formed from synthetic material, leather or woven fabric.

9. The seat cover according to claim 8, wherein the fastening material is formed from synthetic material.

10. The seat cover according to claim 1, wherein each of the lower seat cover and the upper seat cover comprises a plurality of cover parts.

11. The seat cover according to claim 10, wherein at least the one of the cover parts is provided with the at least one edge strip.

12. The seat cover according to claim 11, wherein the at least one edge strip is provided in a region where two cover parts are connected with each other.

13. The seat cover according to claim 12, wherein the two cover parts are vertically arranged and releasably connected with each other by the edge strip.

* * * * *